(12) United States Patent
Kim (10) Patent No.: US 10,960,729 B2
(45) Date of Patent: Mar. 30, 2021

(54) AIR VENT FOR VEHICLE

(71) Applicant: Hyundai Mobis Co., Ltd., Seoul (KR)

(72) Inventor: Won Sik Kim, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 90 days.

(21) Appl. No.: 16/388,293

(22) Filed: Apr. 18, 2019

(65) Prior Publication Data
US 2019/0322153 A1    Oct. 24, 2019

(30) Foreign Application Priority Data
Apr. 19, 2018    (KR) .................. 10-2018-0045473

(51) Int. Cl.
*B60H 1/34*    (2006.01)
*B60H 1/00*    (2006.01)

(52) U.S. Cl.
CPC ....... *B60H 1/00685* (2013.01); *B60H 1/3414* (2013.01); *B60H 2001/00721* (2013.01)

(58) Field of Classification Search
CPC .............. B60H 1/00685; B60H 1/3414; B60H 2001/00721; B60H 1/00507; B60H 1/00835; B60H 2001/00099; B60H 1/345; F24F 13/08
USPC ........................................................ 454/333
See application file for complete search history.

(56) References Cited

U.S. PATENT DOCUMENTS 5,588,910 A * 12/1996 Hutter .................. B60H 1/34
                                                         454/154

FOREIGN PATENT DOCUMENTS

DE       102014009850 A1 * 12/2014 ............. B60H 1/345
DE       102016225128 A1 *  6/2018 ............. B60H 1/3414
KR       10-2010-0058374       6/2010

OTHER PUBLICATIONS

Sismanoglu, Ahmet, DE102014009850 Translation.pdf, "Luftausströmer für ein Fahrzeug, insbesondere einen Personenkraftwagen ", Dec. 2014, pp. 1-6.*

* cited by examiner

*Primary Examiner* — Kenneth J Hansen
*Assistant Examiner* — Ryan L Faulkner
(74) *Attorney, Agent, or Firm* — H.C. Park & Associates, PLC (57) ABSTRACT

An air vent for a vehicle may include: a duct having a passage through which air is moved; a first adjuster rotatably installed in the duct, and configured to guide a discharge direction of air while rotating in a side-to-side direction; a second adjuster rotatably installed in the duct with the first adjuster, and configured to guide a discharge direction of air while rotating in an up and down direction or block an air flow passing through the duct; and a driving unit connected to the second adjuster and configured to supply power to rotate the second adjuster.

7 Claims, 8 Drawing Sheets

AIR VENT FOR VEHICLE

CROSS-REFERENCES TO RELATED APPLICATION

This application claims priority from and the benefit of Korean Patent Application No. 10-2018-0045473, filed on Apr. 19, 2018, which is hereby incorporated by reference for all purposes as if set forth herein.

BACKGROUND

Field

Exemplary embodiments relate to an air vent for a vehicle, and more particularly, to an air vent for a vehicle, in which a part for controlling the direction of air upward or downward and a part for controlling an air flow can be implemented as a single part.

Discussion of the Background

In general, a vehicle has an air conditioning system to adjust the inside temperature according to the season, and cool air and warm air which are generated by the air conditioning system are discharged to the inside of the vehicle through an air outlet installed in an instrument panel.

The air outlet has an air vent mounted therein to adjust the direction and amount of warm air or cool air generated from the air conditioning system. That is, the warm air or cool air generated from the air conditioning system may be passed through a duct and then discharged to the inside of the vehicle through the air vent. At this time, a driver adjusts the direction of the discharged air by operating a knob installed on the air vent.

The conventional air vent separately includes a part for adjusting the direction of air upward or downward and a part for controlling an air flow moved through the air vent. Therefore, the manufacturing cost is increased. Therefore, there is a demand for a device capable of solving the problem.

The above information disclosed in this Background section is only for enhancement of understanding of the background of the invention and, therefore, it may contain information that does not constitute prior art.

SUMMARY

Exemplary embodiments of the present invention provide an air vent for a vehicle, in which a part for controlling the direction of air upward or downward and a part for controlling an air flow can be implemented as a single part.

Additional features of the invention will be set forth in the description which follows, and in part will be apparent from the description, or may be learned by practice of the invention.

In one embodiment, an air vent for a vehicle may include: a duct having a passage through which air is moved; a first adjuster rotatably installed in the duct, and configured to guide a discharge direction of air while rotating in a side-to-side direction; a second adjuster rotatably installed in the duct with the first adjuster, and configured to guide a discharge direction of air while rotating in an up and down direction or block an air flow passing through the duct; and a driving unit connected to the second adjuster and configured to supply power to rotate the second adjuster.

The air vent may further include a flow path guide installed between the second adjuster and an outlet of the duct, and configured to guide the air having passed through the second adjuster to the outlet.

The flow path guide may include a plurality of flow path guides which are horizontally installed in the duct.

The flow path guide may have a longitudinal cross-section formed in a triangle shape.

The flow path guide may include a first guide and a second guide which are horizontally installed in the duct, and facing surfaces of the first and second guides may be formed as flat surfaces.

The first adjuster may include: a first adjusting body rotatably installed in the duct; and a side groove formed at a side surface of the first adjusting body, facing the flow path guide.

The second adjuster may include: a second adjusting body rotatably installed in the duct, and connected to the driving unit so as to receive power; and an inner member fixed to a hollow portion formed in the second adjusting body, and having a plate shape.

An entrance area of the hollow portion may be wider than an exit area of the hollow portion.

The second adjusting body may be formed in a cylindrical shape, and adjusts the direction of the air passing through the inside of the duct or blocks the movement of the air, depending on the rotation direction thereof.

The driving unit may be positioned outside the duct, and have an output shaft connected to the second adjuster so as to transfer rotary power.

In accordance with the embodiment of the present invention, the function of the damper which adjusts the direction of the air passing through the inside of the duct or blocks the movement of the air may be implemented as a single member, which makes it possible to reduce the manufacturing cost.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Figure 1:
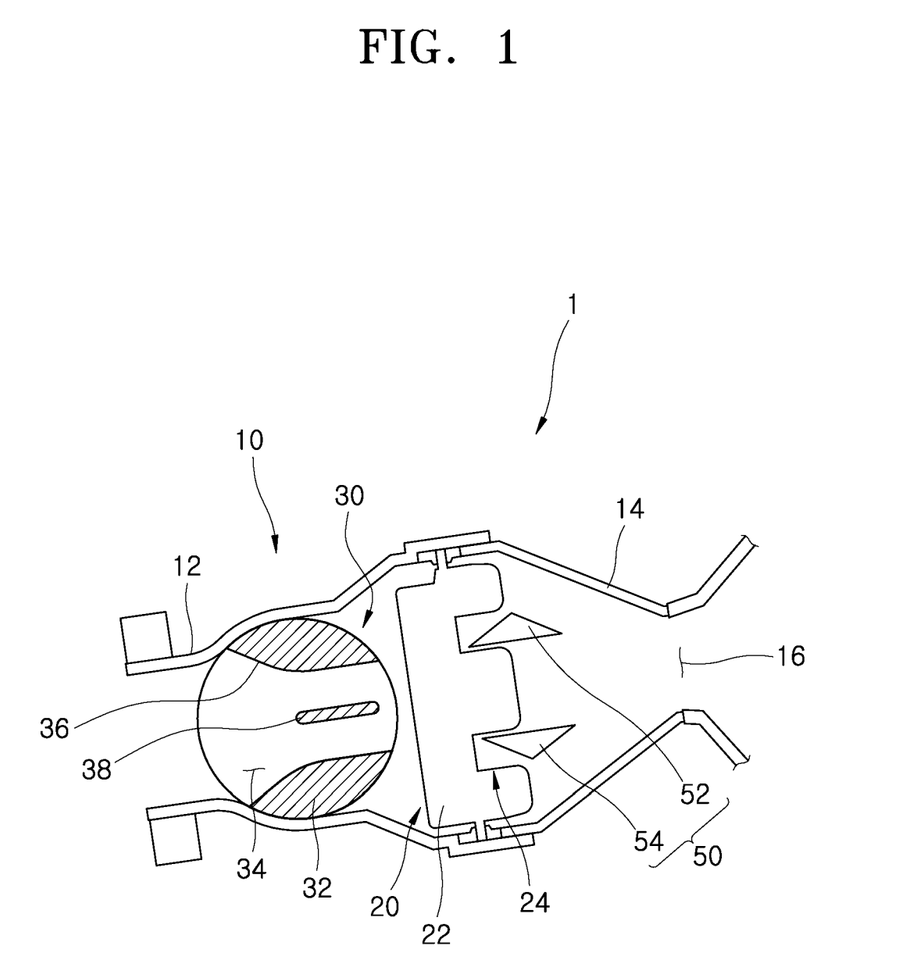
FIG. 1 is a cross-sectional view schematically illustrating a structure of an air vent for a vehicle in accordance with an embodiment of the present invention.
Figure 2:
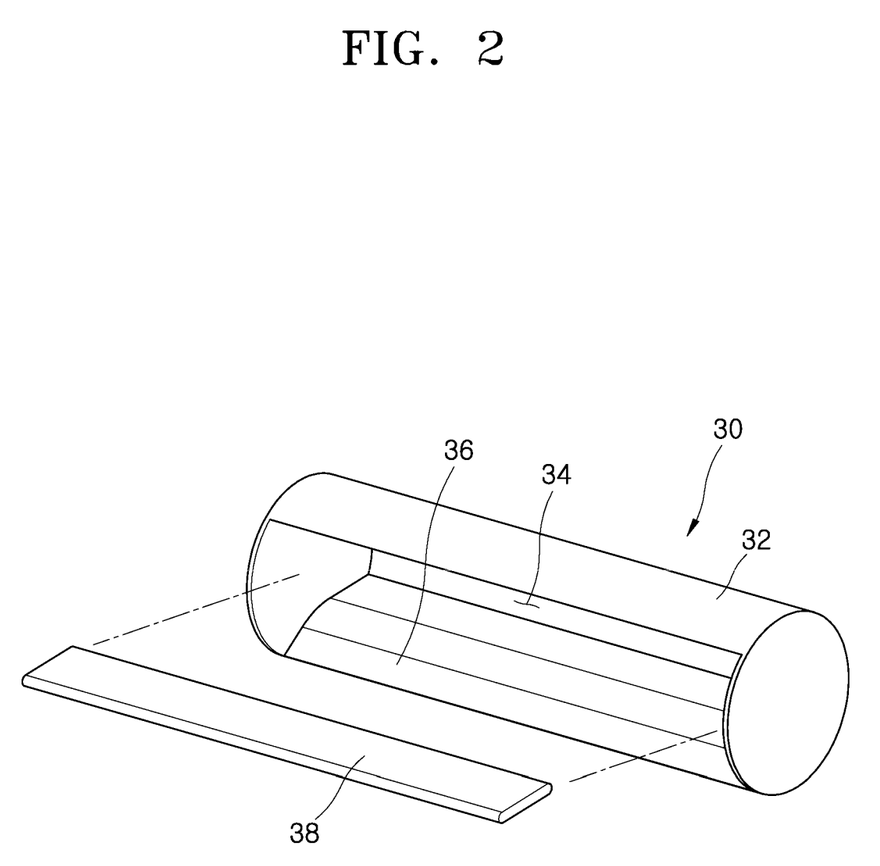
FIG. 2 is a perspective view illustrating a second adjuster in accordance with the embodiment of the present invention.
Figure 3:
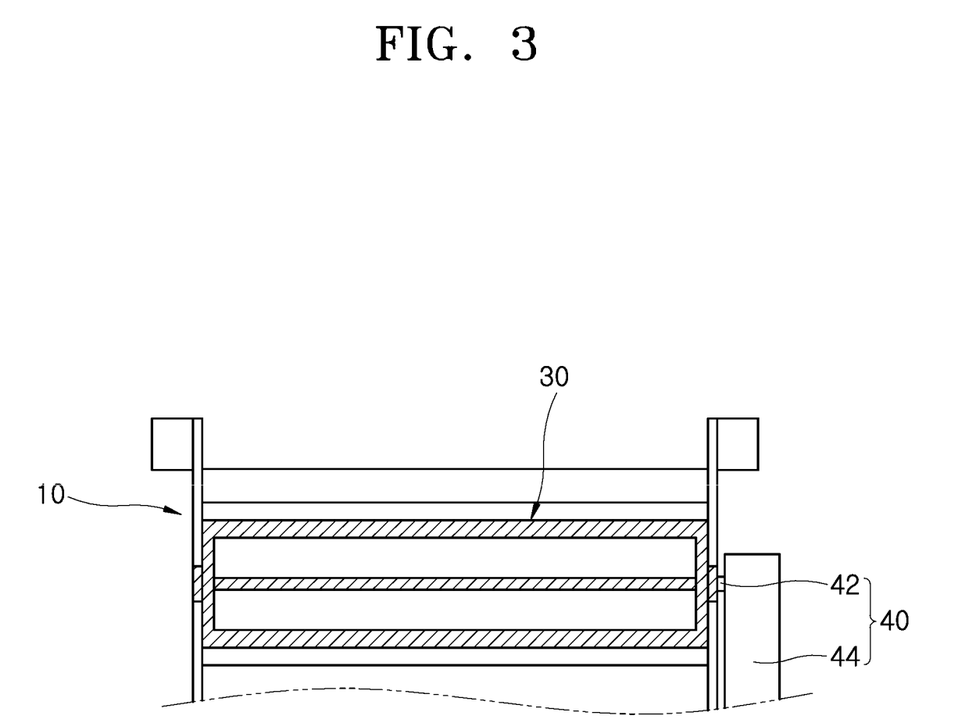
FIG. 3 is a side view illustrating that the second adjuster in accordance with the embodiment of the present invention is operated in an open state.
Figure 4:
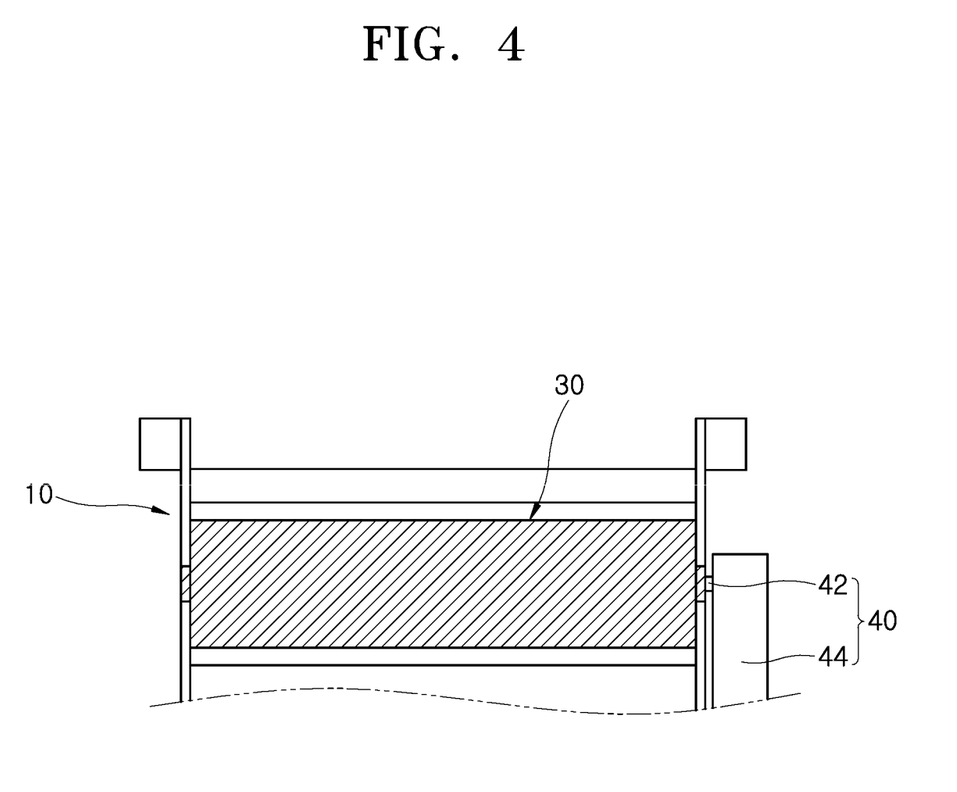
FIG. 4 is a side view illustrating that the second adjuster in accordance with the embodiment of the present invention is operated in a close state.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein FIG. 1 is a cross-sectional view schematically illustrating a structure of an air vent for a vehicle in accordance with an embodiment of the present invention, FIG. 2 is a perspective view illustrating a second adjuster in accordance with the embodiment of the present invention, FIG. 3 is a side view illustrating that the second adjuster in accordance with the embodiment of the present invention is operated in an open state, and FIG. 4 is a side view illustrating that the second adjuster in accordance with the embodiment of the present invention is operated in a close state.

As illustrated in FIGS. 1 to 4, the air vent 1 for a vehicle in accordance with the embodiment of the present invention may include a duct 10, a first adjuster 20, a second adjuster 30 and a driving unit 40. The duct 10 may have a passage installed therein such that air is moved through the passage. The first adjuster 20 may be rotatably installed in the duct 10 and guide the discharge direction of air while rotating in the side-to-side direction. The second adjuster 30 may be rotatably installed in the duct 10 with the first adjuster 20, and guide the discharge direction of air while rotating in the up and down direction or block an air flow passing through the duct 10. The driving unit 40 may be connected to the second adjuster 30 and supply power to rotate the second adjuster 30.

The duct 10 may serve as a pipe line having a passage through which air is moved, and include the first adjuster 20, the second adjuster 30 and a flow path guide 50, which are installed therein. The duct 10 in accordance with an embodiment may include first and second ducts 12 and 14.

Since the second duct 14 is connected to the rear of the first duct 12, the air may be sequentially passed through the first and second ducts 12 and 14, and then discharged to the outside of the duct 10 through an outlet 16. The second adjuster 30 may be rotatably installed in the first duct 12, and the flow path guide 50 may be installed in the second duct 14. Between the second adjuster 30 and the flow path guide 50, the first adjuster 20 may be installed.

Since the first duct 12 facing the second adjuster 30 has a curved groove formed therein, a curved surface formed at the outside of the second adjuster 30 may come in surface contact with the inside of the first duct 12, when abutting the first duct 12. Therefore, since air is not moved between the first duct 12 and the second adjuster 30 abutting the first duct 12, an air flow A may be controlled.

The first duct 12 may be installed in such a shape that the internal space thereof gradually widens toward the rear side where the second duct 14 is installed. The second duct 14 may be installed in such a shape that the internal space thereof gradually narrows toward the rear side where the outlet 16 is installed.

The first adjuster 20 may be rotatably installed in the duct 10, and guide the discharge direction of the air in the side-to-side direction while rotating in the side-to-side direction. The first adjuster 20 in accordance with an embodiment may include a first adjusting body 22 and a side groove 24. The plurality of first adjusters 20 may be installed in the duct 10.

The first adjusting body 22 may be rotatably installed in the duct 10 and extended in the top-to-bottom direction. The first adjusting body 22 having a rectangular plate shape may be erected and in the duct 10. The plurality of first adjusting bodies 22 may be connected through a link and rotated together.

The side groove 24 may be formed at a side surface of the first adjusting body 22, facing the flow path guide 50. Therefore, since the flow path guide 50 is positioned in the side groove 24 when the first adjusting body 22 is rotated, the first adjusting body 22 may be prevented from interfering with the flow path guide 50.

The first adjuster 20 may adjust the air flow A in the side-to-side direction of the air vent 1 for a vehicle. Since the first adjuster 20 is directly connected to an actuator (not illustrated) installed outside the duct 10 and rotated by the actuator, the number of parts can be minimized.

The second adjuster 30 may be rotatably installed in the duct 10 with the first adjuster 20, and formed in various shapes as long as the second adjuster 30 can guide the discharge direction of air while rotating in the up and down direction or block an air flow passing through the duct 10. The second adjuster 30 in accordance with an embodiment may include a second adjusting body 32 and an inner member 38.

The second adjusting body 32 may be rotatably installed in the duct 10 and connected to the driving unit 40 so as to receive power. The second adjusting body 32 in accordance with an embodiment may be formed in a cylindrical shape, and guide the air flow A according to the direction of a hollow portion 34 formed through the second adjusting body 32. Since the second adjusting body 32 positioned in the duct 10 has a spherical cross-section, the second adjusting body 32 may be easily rotated in the duct 10.

Since the second adjusting body 32 facing the hollow portion 34 has an inclined guide surface 36 formed therein, an entrance area of the hollow portion 34 may be wider than an exit area of the hollow portion 34. Therefore, air may be easily introduced through the entrance of the hollow portion 34.

The inner member 38 may be formed in a plate shape, fixed to the inside of the hollow portion 34, and installed across the hollow portion 34.

The second adjusting body 32 in accordance with an embodiment may be connected to the driving unit 40 and rotated. The second adjusting body 32 may adjust the direction of air passing through the inside of the duct 10 or block the movement of air, depending on the rotation direction thereof. The second adjusting body 32 may be rotated in the up and down direction to adjust the air flow A passing through the second adjuster 30 in the up and down direction.

When the second adjuster 30 is rotated in such a manner that both sides of the hollow portion 34 face the first duct 12, the air flow A moved along the first duct 12 may be blocked by the second adjuster 30 so as not to move to the outlet 16. Therefore, the function of guiding the air flow A in the up and down direction through the rotation of the second adjuster 30 or the function of blocking or allowing the air flow A may be implemented through the second adjuster 30 as a single part, which makes it possible to reduce the number of parts. Thus, the exterior size of the air vent 1 for a vehicle in accordance with the embodiment of the present invention can be reduced to improve the interior of the vehicle having the air vent 1 installed therein.

In accordance with the embodiment of the present invention, the second adjuster 30 may adjust the air flow A in the top-to-bottom direction of the air vent 1 for a vehicle, and block the air flow A passing through the duct 10. Since the second adjuster 30 is directly connected to the driving unit 40 installed outside the duct 10 and rotated, the number of parts can be minimized.

The driving unit 40 may include various types of driving devices, as long as the driving devices can be connected to the second adjuster 30 and supply power to rotate the second adjuster 30. In the driving unit 40 in accordance with an embodiment, the driving body 42 using a motor may be positioned outside the duct 10, and an output shaft 44 connected to the driving body 42 may be connected to the second adjuster 30 and transfer rotary power.

The air vent 1 for a vehicle may further include the flow path guide 50 installed between the second adjuster 30 and the outlet 16 of the duct 10, and guiding the air passing through the second adjuster 30 to the outlet 16. The air vent 1 for a vehicle in accordance with the present embodiment may include a plurality of flow path guides 50 which are horizontally installed in the duct 10. The flow path guides 50 may have a longitudinal cross-section formed in a triangle shape, and thus more reliably guide the air flow A.

The flow path guide 50 in accordance with an embodiment may include a first guide 52 and a second guide 54, and the second guide 54 may be installed under the first guide 52. The first and second guides 52 and 54 may be horizontally installed in the duct 10, and have a longitudinal cross-section formed in a triangle shape. The first and second guides 52 and 54 may be positioned between the first adjuster 20 and the outlet 16, and the facing surfaces of the first and second guides 52 and 56 may be formed as flat surfaces.

Therefore, a straight air flow A may also be formed through a space formed between the first and second guides 52 and 54. Furthermore, an air flow A may also be formed through a space formed between the first guide 52 and the duct 10. Alternatively, the air flow A may also be formed through a space formed between the second guide 54 and the duct 10.

The air flow A passing between the first guide 52 and the duct 10 may be moved upward at the front of the first guide (the left side based on FIG. 1). The air flow A having passed through the first guide 52 may be moved downward. At this time, since the first guide 52 has a triangle shape to protrude toward the duct 10, the first guide 52 may more stably guide the air flow A passing between the first guide 52 and the duct 10.

The air flow A passing between the second guide 54 and the duct 10 may be moved downward at the front of the second guide (left side based on FIG. 2). The air flow A having passed through the second guide 54 may be moved upward. At this time, since the second guide 54 has a triangle shape to protrude toward the duct 10, the second guide 54 may more stably guide the air flow A passing between the second guide 54 and the duct 10.

Hereafter, the operation of the air vent 1 for a vehicle in accordance with the embodiment of the present invention will be described in detail with reference to the accompanying drawings.

Figure 5:
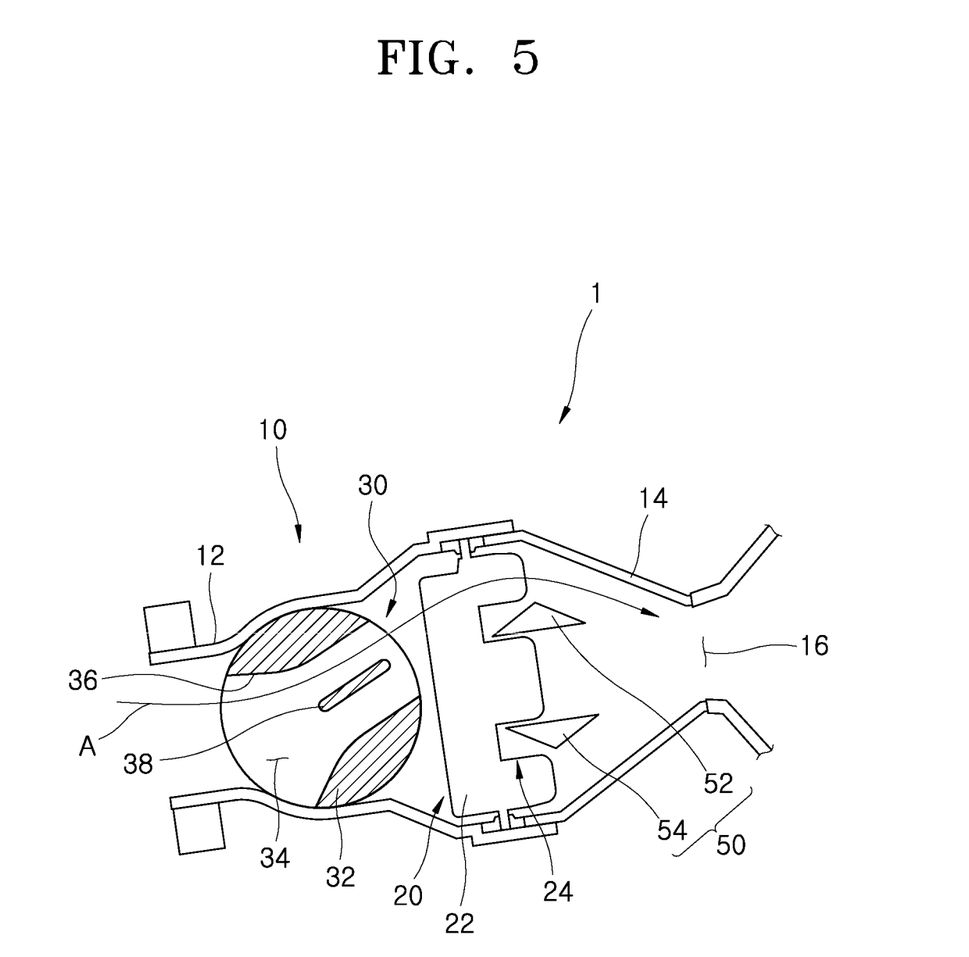
FIG. 5 is a cross-sectional view illustrating that air discharged from the air vent for a vehicle in accordance with the embodiment of the present invention is moved downward.
Figure 6:
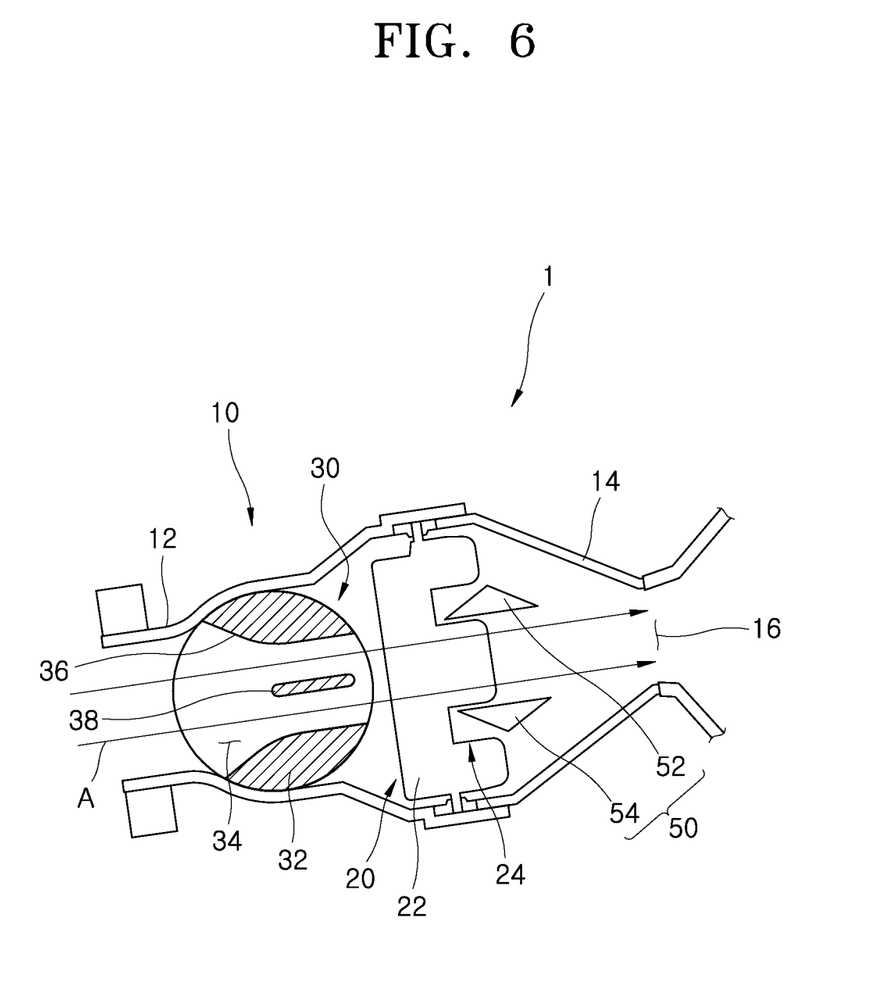
FIG. 6 is a cross-sectional view illustrating that air discharged from the air vent for a vehicle in accordance with the embodiment of the present invention is moved forward.
Figure 7:
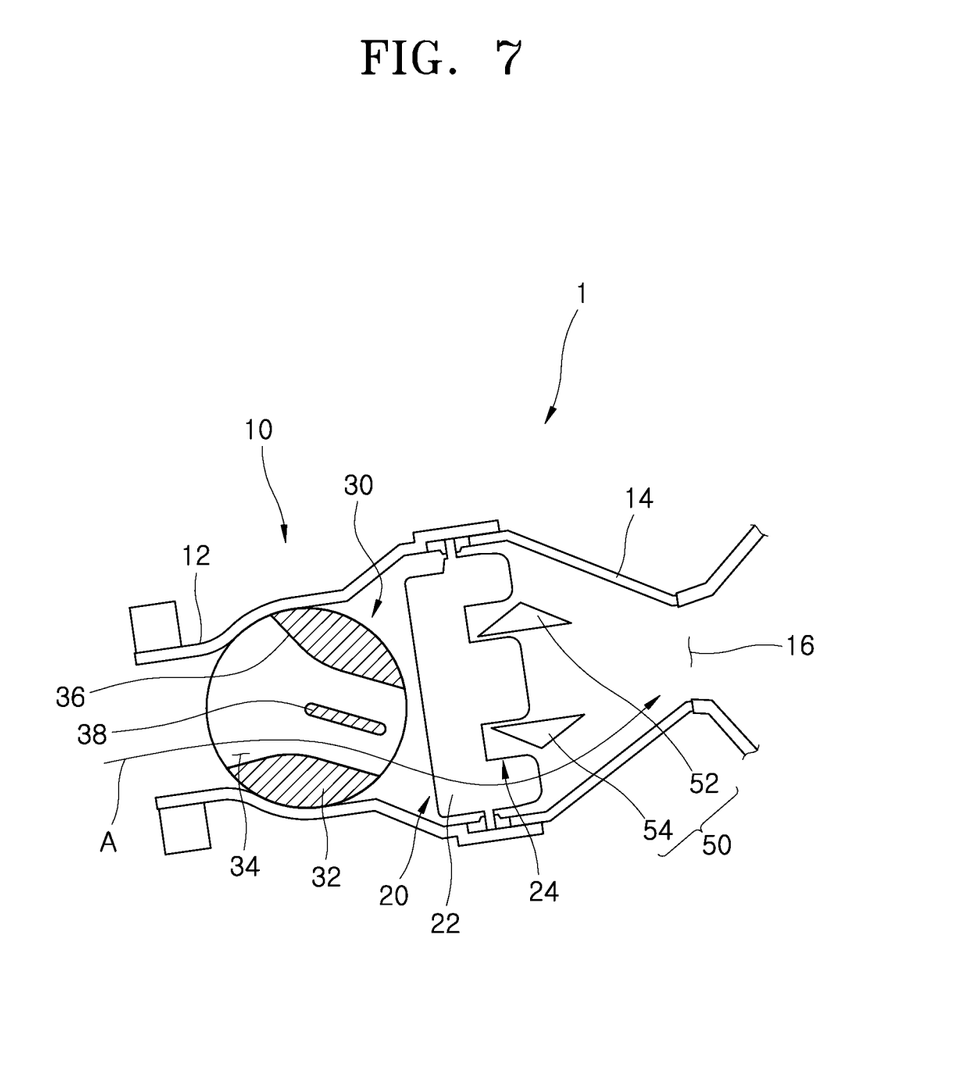
FIG. 7 is a cross-sectional view illustrating that air discharged from the air vent for a vehicle in accordance with the embodiment of the present invention is moved upward.
Figure 8:
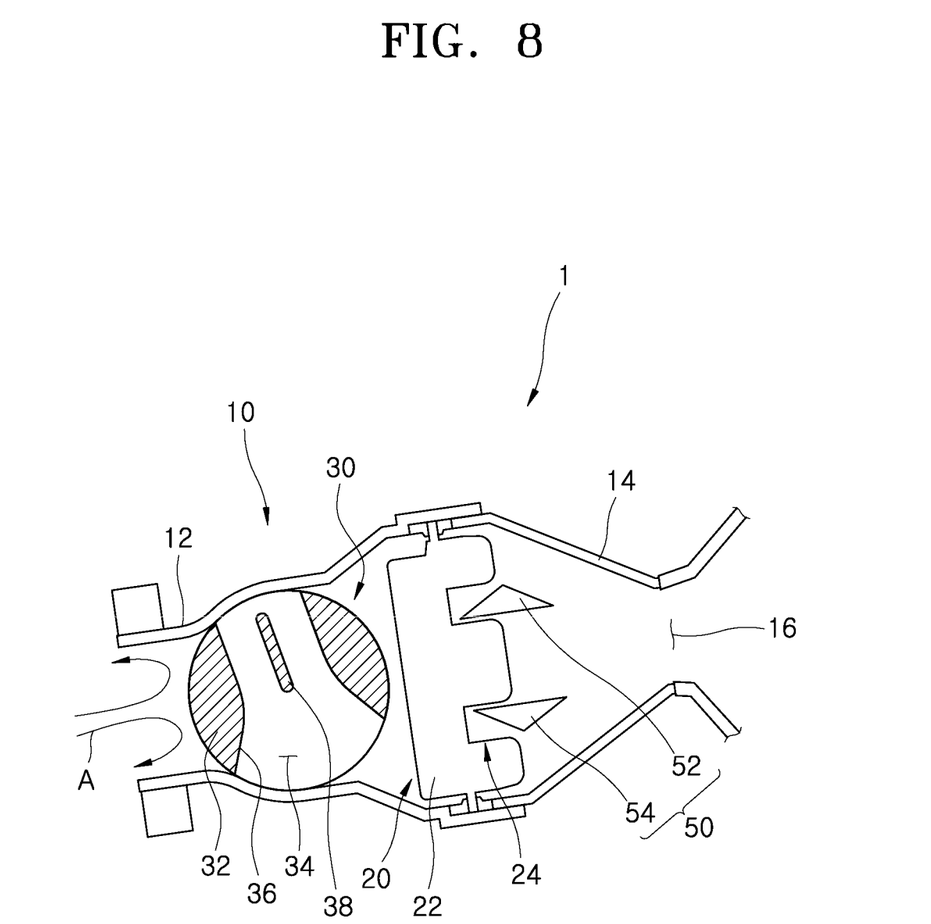
FIG. 8 is a cross-sectional view illustrating that the second adjuster in accordance with the embodiment of the present invention is operated in a close state.

FIG. 5 is a cross-sectional view illustrating that air discharged from the air vent for a vehicle in accordance with the embodiment of the present invention is moved downward, FIG. 6 is a cross-sectional view illustrating that air discharged from the air vent for a vehicle in accordance with the embodiment of the present invention is moved forward, FIG. 7 is a cross-sectional view illustrating that air discharged from the air vent for a vehicle in accordance with the embodiment of the present invention is moved upward, and FIG. 8 is a cross-sectional view illustrating that the second adjuster in accordance with the embodiment of the present invention is operated in a close state.

When the air flow A discharged from the air vent 1 for a vehicle is controlled to move downward as illustrated in FIG. 5, the second adjuster 30 may be rotated upward. Therefore, the air introduced into the duct 10 through the first duct 12 may be passed through the hollow portion 34 of the second adjusting body 32, and guided as the air flow A toward the duct 10 and the first guide 52. The air flow A passing between the duct 10 and the first guide 52 may be guided in a downward oblique direction along the second duct 14, and discharged to the outside of the outlet 16.

When the air flow A discharged from the air vent 1 for a vehicle is moved in a straight direction as illustrated in FIG. 6, the second adjuster 30 may be set to the initial position. At this time, since the inner member 38 of the second adjuster 30 is installed in the horizontal direction, the air flow A passing through the hollow portion 34 may be guided in a straight direction toward the outlet 16, and discharged to the outside of the outlet 16.

When the air flow A discharged from the air vent 1 for a vehicle is controlled to move upward as illustrated in FIG. 7, the second adjuster 30 may be rotated downward. Therefore, the air introduced into the duct 10 through the first duct 12 may be passed through the hollow portion 34 of the second adjusting body 32 and guided as the air flow A toward the duct 10 and the second guide 54. The air flow A passing between the duct 10 and the second guide 54 may be guided in an upward oblique direction along the second duct 14, and discharged to the outside of the outlet 16.

When the air flow A discharged from the air vent 1 for a vehicle is blocked as illustrated in FIG. 8, the second adjuster 30 may be rotated in such a manner that the hollow portion 34 faces the duct 10. Since the second adjusting body 32 blocks the inside of the first duct 12, the air flow A to the inside of the first duct 12 may be blocked.

In accordance with the embodiment of the present invention, the function of the damper which adjusts the direction of the air passing through the inside of the duct 10 or blocks the movement of the air may be implemented as a single member, which makes it possible to reduce the manufacturing cost. Furthermore, since the driving unit 40 is installed to operate the second adjuster 30 and the separate actuator is installed to automatically operate the first adjuster 20, the use of the driving device can be minimized to thereby reduce the manufacturing cost.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An air vent for a vehicle, comprising: a duct having a passage through which air is moved; a first adjuster rotatably installed in the duct, and configured to guide a discharge direction of air while rotating in a side-to-side direction; a second adjuster rotatably installed in the duct with the first adjuster, and configured to guide a discharge direction of air while rotating in an up and down direction or to block an air flow passing through the duct; a driving unit connected to the second adjuster and configured to rotate the second adjuster; and a flow path guide installed between the second adjuster and an outlet of the duct, and the flow path guide is configured to guide the air having passed through the second adjuster to the outlet, wherein the flow path guide comprises a first guide and a second guide, both of the first guide and the second guide are horizontally installed in the duct, and facing surfaces of the first and second guides are formed as flat surfaces.

2. The air vent of claim 1, wherein the first and second guides each has a longitudinal cross-section formed in a triangle shape.

3. The air vent of claim 1, wherein the first adjuster comprises:
a first adjusting body rotatably installed in the duct; and
a side groove formed at a side surface of the first adjusting body, facing the flow path guide.

4. The air vent of claim 1, wherein the second adjuster comprises:
a second adjusting body rotatably installed in the duct, and connected to the driving unit configured to be rotated by the driving unit; and
an inner member fixed to a hollow portion formed in the second adjusting body, and having a plate shape.

5. The air vent of claim 4, wherein an entrance area of the hollow portion is wider than an exit area of the hollow portion.

6. The air vent of claim 4, wherein the second adjusting body is formed in a cylindrical shape, and is configured to adjust a direction of the air passing through an inside of the duct or to block a movement of the air, depending on a rotation direction of the second adjusting body.

7. The air vent of claim 1, wherein the driving unit is positioned outside the duct, and has an output shaft connected to the second adjuster configured to transfer rotary power.

* * * * *